US 8,180,619 B2

(12) United States Patent
Glass et al.

(10) Patent No.: US 8,180,619 B2
(45) Date of Patent: *May 15, 2012

(54) SYSTEM AND METHOD FOR DIGITAL EFFECTS ANALYSIS

(75) Inventors: John Glass, Franklin, MA (US);
Thomas J. Erkkinen, Ann Arbor, MI (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/280,034

(22) Filed: Oct. 24, 2011

(65) Prior Publication Data
US 2012/0041746 A1 Feb. 16, 2012

Related U.S. Application Data

(63) Continuation of application No. 11/320,214, filed on Dec. 27, 2005, now Pat. No. 8,046,207.

(51) Int. Cl.
*G06F 17/50* (2006.01)
(52) U.S. Cl. .......................... 703/13; 716/106
(58) Field of Classification Search .............. 703/6, 13, 703/22; 716/106, 111, 136; 717/104, 106, 717/124
See application file for complete search history.

(56) References Cited

U.S. PATENT DOCUMENTS

| | | | | |
|---|---|---|---|---|
| 5,521,839 | A * | 5/1996 | Doolittle et al. | 702/65 |
| 6,504,935 | B1 * | 1/2003 | Jackson | 381/61 |
| 7,295,018 | B2 * | 11/2007 | Oakley | 324/533 |
| 2003/0033587 | A1 * | 2/2003 | Ferguson et al. | 717/104 |
| 2005/0031132 | A1 * | 2/2005 | Browning et al. | 381/59 |
| 2006/0104451 | A1 * | 5/2006 | Browning et al. | 381/59 |

OTHER PUBLICATIONS

Control System Toolbox, Version 4.2, 1999.*
Model-Based and System-Based Design, 2002.*
National Instruments, "LabVIEW, Simulation Module User Manual," (2005.*
The MathWorks, "Control System Toolbox, for Use with Matlab, Reference, Version 5," (2002).*
The MathWorks, "Simulink Control Design, for Use with Simulink, Getting Started, Version 1 ," (2005).*
The MathWorks, "Simulink Fixed Point, for Use with Simulink, User's Guide, Version 5," (2005).*

* cited by examiner

*Primary Examiner* — Paul Rodriguez
*Assistant Examiner* — Andre Pierre Louis
(74) *Attorney, Agent, or Firm* — Nelson Mullins Riley & Scarborough LLP

(57) ABSTRACT

An analysis tool analyzes a model to determine the digital effect of the model in a modeling or programming environment. With the analysis tool, a user can determine minimum hardware functionality needed to execute the software generated from the model. The hardware functionality may include the word size of the microprocessor that executes the software appropriately. The hardware functionality may also include the execution speed of the microprocessor executing the software. The hardware functionality may further include the functionality of other hardware elements, such as the word length of an Analog to Digital converter. The analysis tool enables a user to produce a system at a low cost while achieving necessary performance criteria.

22 Claims, 15 Drawing Sheets

SYSTEM AND METHOD FOR DIGITAL EFFECTS ANALYSIS

RELATED APPLICATION

This Application is continuation of U.S. patent application Ser. No. 11/320,214, which was filed on Dec. 27, 2005, now U.S. Pat. No. 8,046,207. The above-identified application is hereby incorporated by reference in its entirety as though fully set forth herein.

FIELD OF THE INVENTION

The present invention relates to a modeling or programming environment, in particular to a method, system and medium for analyzing a model to determine the digital effects of the model in the modeling or programming environment.

BACKGROUND OF THE INVENTION

A dynamic system (either natural or man-made) is a system whose response at any given time is a function of its input stimuli, its current state, and the current time. Such systems range from simple to highly complex systems. Physical dynamic systems include a falling body, the rotating earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processors, nuclear reactors, a stock market.

Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve the educational purpose of educating others on the basic principles governing physical systems. The models and results are often used as a scientific communication medium between humans. The term "model-based design" is used to refer to the use of graphical models in the development, analysis, and validation of dynamic systems.

Dynamic systems are typically modeled in simulation environments as sets of differential, difference, and/or algebraic equations. At any given instant of time, these equations may be viewed as relationships between the system's output response ("outputs"), the system's input stimuli ("inputs") at that time, the current state of the system, the system parameters, and time. The state of the system may be thought of as a numerical representation of the dynamically changing configuration of the system. For instance, in a physical system modeling a simple pendulum, the state may be viewed as the current position and velocity of the pendulum. Similarly, a signal-processing system that filters a signal would maintain a set of previous inputs as the state. The system parameters are the numerical representation of the static (unchanging) configuration of the system and may be viewed as constant coefficients in the system's equations. For the pendulum example, a parameter is the length of pendulum and for the filter example; a parameter is the values of the filter taps.

In practice, except for the most basic systems, mathematical models for dynamic systems involve a complex set of mathematical transformations applied in some prescribed manner with the outputs of some transformations forming the inputs of others. Each elemental transformation may be viewed in isolation as a simple dynamic system falling into one of the categories listed above. Therefore, a complex dynamic system may be modeled as an interconnection of various simple dynamic systems.

A schematic representation of such an interconnection that has evolved over the years is the graphical model. Such graphical models have now become a standard means in textbooks, design papers, journal articles, and specifications to communicate the details of a dynamic system's behavior. Various classes of graphical models describe computations that can be performed on computational hardware, such as a computer, microcontroller, FPGA, and custom hardware. Classes of such graphical models include time-based block diagrams, such as those found within Simulink® from The MathWorks, Inc. of Natick, Mass., state-based and flow diagrams, such as those found within Stateflow® from The MathWorks, Inc. of Natick, Massachusetts, data-flow diagrams, circuit diagrams, and software diagrams, such as those found in the Unified Modeling Language (UML). A common characteristic among these various forms of graphical models is that they define semantics on how to execute the model.

Generally, graphical analysis and simulation methods, such as the block diagram method, are used in modeling for design, analysis, and synthesis of engineered systems. The visual representation allows for a convenient interpretation of model components and structure and provides a quick intuitive notion of system behavior. Block diagrams are a set of graphical connections between blocks to model a system. The individual blocks in a block diagram represent mathematical operations and output a result.

Conventional simulation models become more complex as models are developed that model more complex systems. Hundreds of thousands of blocks that represent primitive and aggregate mathematical operations may be present. To manage the complexity of such models, the principles of partitioning, abstraction, and hierarchy are applied.

In addition to graphical based modeling or simulation, other applications can be utilized to model a system. For example, MATLAB® provided by The MathWorks, Inc. of Natick, Massachusetts, is an interactive programming and interpretive application that can implement a variety of computing tasks in engineering and science, while also having the ability to execute other executable programs. Some of the tasks that MATLAB® can perform range from data acquisition and analysis to application development. The MATLAB® environment integrates mathematical computing, visualization, and technical programming language. MATLAB® includes built-in interfaces that provide access and import data from instruments, files, and external databases and programs.

In addition, MATLAB® can integrate external routines written in C, C++, Fortran, and Java with MATLAB® applications. As such, MATLAB® provides an example of interactive programming and interpretive environments that can work in conjunction with C routines provided external to MATLAB® including those provided by third party providers.

MATLAB®, Simulink® and their family of products, such as Simulink® Control Design, Fixed-point Toolbox, Simulink® Fixed-point, Real-Time Workshop, Real-Time Workshop Embedded Coder, Stateflow® Coder, Simulink® Verification and Validation, Control System Toolbox, Robust Control Toolbox, etc., have been used to develop and analyze embedded control systems, which may include embedded control software and hardware. The control systems are sometimes embedded in mass production systems. One of the primary concerns in the mass production systems is to produce embedded control systems that have high functionality at a low cost.

One of the key cost considerations is the microprocessor (the price of which generally increases according to its word size). For example, 8-bit microprocessors are less expensive than 32-bit microprocessors. The execution speed of 8-bit microprocessors generally is, however, lower than that of more expensive 32-bit microprocessors. Therefore, it is desired to provide an analysis tool for determining the minimum digital computer system capability needed to satisfy overall system performance requirements.

SUMMARY OF THE INVENTION

The present invention provides an analysis tool for analyzing a model to determine the digital effect of the model in a modeling or programming environment. In the present invention, the digital effects generally refer to the effects of the model when the software generated from the model is executed in a digital system. With the analysis tool, a user can determine minimum hardware functionality needed to execute the software generated from the model. The present invention may enable the user to emulate (or simulate) the digital system to determine whether the digital system can achieve a required performance with the hardware functionality. The hardware functionality may include the minimum word size for a microprocessor to execute the software properly. The hardware functionality may also include the execution speed of the microprocessor executing the software and the functionality of other hardware elements included in the implementation of the model, such as the word length of a sensor/converter (e.g., an analog to digital converter). The analysis tool may determine if the software generated from the model performs adequately on the given hardware functionality. The performance can be evaluated via classical control system analysis methods, such as the stability margin requirements, the rise time in a step response of the system, a numerical accuracy needed in the system, and the robustness to uncertainty of the system. The analysis tool enables a user to determine the minimum digital computer system capability needed to satisfy overall system performance requirements. The analysis tool also enables a user to produce a system at a low cost while achieving necessary performance criteria.

In accordance with one aspect of the present invention, a method is provided for analyzing a model in a modeling environment. The method includes the step of providing a model of a system, the system including a controller for controlling the system. A block is selected that relates to the controller. The block includes a parameter that affects the stability or required performance of the system. A linear model is programmatically extracted from the model relative to the block. The linear model is analyzed to programmatically select a value of the parameter that ensures an achievement of the stability or required performance.

In another aspect of the present invention, a system is provided for analyzing a model. The system includes a modeling environment for providing a model of a system, the system including a controller for controlling the system. The system also includes an analysis tool for enabling a user to select a block relating to the controller. The block includes a parameter that affects the stability or required performance of the system. The analysis tool programmatically extracts a linear model from the model relative to the block, and analyzes the linear model to programmatically select a value of the parameter that ensures an achievement of the stability or required performance.

In another aspect of the present invention, a medium is provided for holding instructions executable in a computing device. The instructions are executed to provide a model of a system, the system including a controller for controlling the system. The instructions are also executed to select a block that relates to the controller. The block includes a parameter that affects the stability or required performance of the system. A linear model is programmatically extracted from the model relative to the block. The linear model is analyzed to programmatically select a value of the parameter that ensures an achievement of the stability or required performance.

BRIEF DESCRIPTION OF THE DRAWINGS

The present invention will become better understood with reference to the following description and accompanying drawings, wherein.

DETAILED DESCRIPTION

Figure 1:
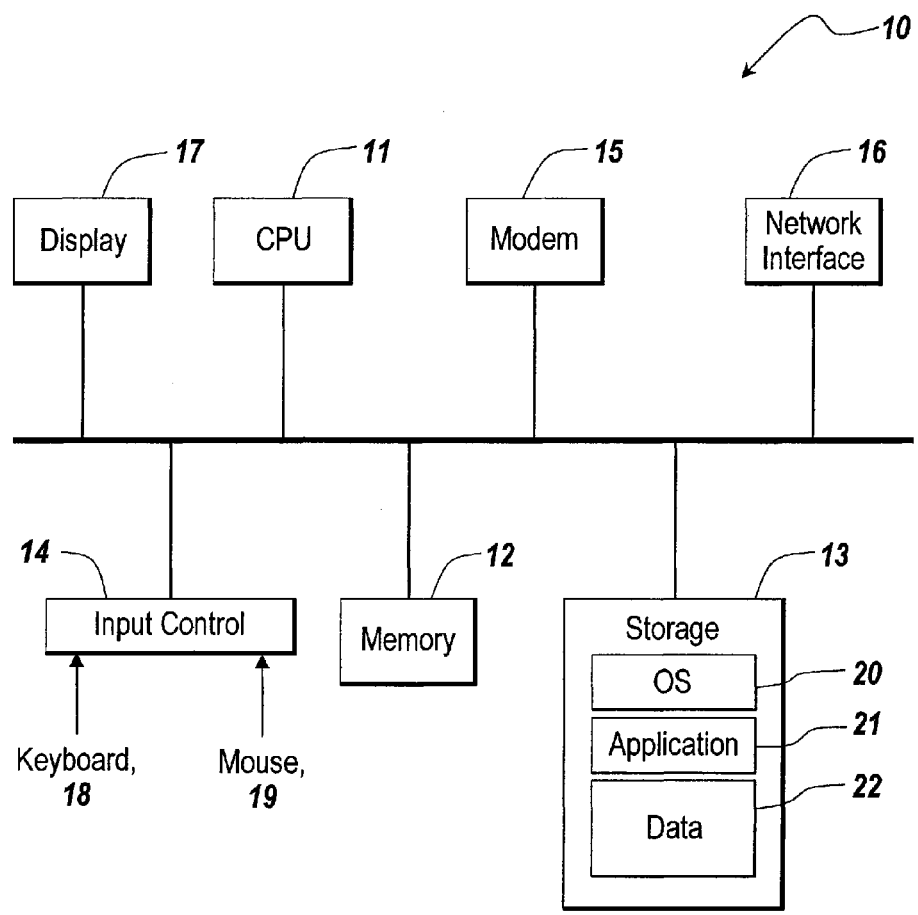
FIG. 1 shows an exemplary computing device suitable for practicing the illustrative embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides an analysis tool for analyzing the behavior of a model in a programming or modeling environment. The terms "program/programming" and "model/modeling" will be used interchangeably in the description of the illustrative embodiment. In the description of the illustrative embodiment, the simulation of the program/model is also referred to as the execution of the program/model.

The illustrative embodiment will be described below solely for illustrative purposes relative to a graphical model. Although the illustrative embodiment will be described relative to a graphical model, one of skill in the art will appreciate that the present invention may be implemented using a text-based model, such as a MATLAB® based program or model.

The illustrative embodiment will be described below solely for illustrative purposes relative to a time-based block diagram model. Although the illustrative embodiment will be described relative to the time-based block diagram model, one of skill in the art will appreciate that the present invention may apply to other graphical programs/models, including state-based, event-based, data flow diagram, physical diagram, and software diagram such as the Unified Modeling Language (UML) model, as long as the graphical model has some notion of semantics that allows it to be interpreted or transformed into an executable for a computer processor/microcontroller or directly synthesized in application-specific hardware.

An exemplary time-based block diagram environment can be found in Simulink® from The MathWorks, Inc. of Natick, Mass. Simulink® provides tools for modeling and simulating a variety of dynamic systems in one integrated, graphical environment. Simulink® enables users to design a block diagram for a target system, simulate the system's behavior, analyze the performance of the system, and refine the design of the system. Simulink® allows users to design target systems through a user interface that allows drafting of block diagrams of the target systems. All of the blocks in a block library provided by Simulink® and other programs are available to users when the users are building the block diagram of the target systems. Individual users may be able to customize this model block to: (a) reorganize blocks in some custom format, (b) delete blocks they do not use, and (c) add custom blocks they have designed.

The illustrative embodiment provides an analysis tool for analyzing a block diagram model to determine the digital effects of the model in a block diagram modeling or programming environment. In the illustrative embodiment, the digital effects generally refer to the effects of the model when the software generated from the model is executed in a digital system. With the analysis tool, the user can determine the minimum hardware functionality needed to execute the software generated from the model. The analysis tool enables the user to emulate or simulate the digital system to determine whether the digital system can achieve a required performance with the hardware functionality. The hardware functionality that is assessed may include the word size and/or the execution speed of the microprocessor that execute the software. The hardware functionality assessed may also include the functionality of other elements, such as the word length of a sensor/converter (e.g., analog to digital converter). The analysis tool determines if the software generated from the model performs adequately on the given hardware functionality. The performance can be evaluated via classical control system analysis methodologies, such as the stability margin requirements, the rise time in a step response of the system, a numerical accuracy needed in the system, and the robustness to uncertainty of the system. The analysis tool, therefore, enables a user to determine the minimum digital computer system capability needed to satisfy overall system performance requirements. The analysis tool also enables a user to produce a system at a low cost while achieving necessary performance criteria.

The illustrative embodiment will be described below relative to a Simulink® model. Nevertheless, those of skill in the art will appreciate that the present invention may be practiced relative to models implemented in other graphical modeling environments, including but not limited to LabVIEW from National Instruments Corporation of Austin, Tex., and Rational Rose from IBM of White Plains, N.Y.

FIG. 1 is an exemplary computing device 10 suitable for practicing the illustrative embodiment of the present invention, which provides a block diagram environment. One of ordinary skill in the art will appreciate that the computing device 10 is intended to be illustrative and not limiting of the present invention. The computing device 10 may take many forms, including but not limited to a workstation, server, network computer, quantum computer, optical computer, bio computer, Internet appliance, mobile device, a pager, a tablet computer, and the like.

The computing device 10 may be electronic and include a Central Processing Unit (CPU) 11, memory 12, storage 13, an input control 14, a modem 15, a network interface 16, a display 17, etc. The CPU 11 controls each component of the computing device 10 to provide the block diagram environment. The memory 12 temporarily stores instructions and data and provides them to the CPU 11 so that the CPU 11 operates the computing device 10 and runs the block diagram environment. The storage 13 usually contains software tools for applications. The storage 13 includes, in particular, code 20 for the operating system (OS) of the device 10, code 21 for applications running on the operation system including applications for providing the block diagram environment, and data 22 for block diagrams created in the block diagram environment. Those of ordinary skill in the art will appreciate that the application can be stored in the memory 12 as well, much like the data, and even the OS, or they can be stored on the network described below with reference to FIG. 2.

Optionally, the computing device 10 may include multiple CPUs for executing software loaded in the memory 12, and other programs for controlling system hardware. Each of the CPUs can be a single or multiple core processor. The code loaded in the memory 12 may run in a virtualized environment, such as in a Virtual Machine (VM). Multiple VM's may be resident on a single processor. The computing device 10 may include specialized hardware, such as a FPGA and an ASIC, and all or a portion of the code may run on the FPGA or ASIC. This frees up the CPU 11 to do other things and hence accelerates the performance of the computing device 10.

The input control 14 may interface with a keyboard 18, a mouse 19, and other input devices. The computing device 10 may receive through the input control 14 input data necessary for creating block diagrams, such as the selection of the attributes and operations of component blocks in the block diagrams. The computing device 10 may also receive through the input control 14 input data necessary for controlling the execution of the block diagrams. The computing device 10 may display in the display 17 user interfaces for the users to create, edit or execute the block diagrams.

Figure 2:
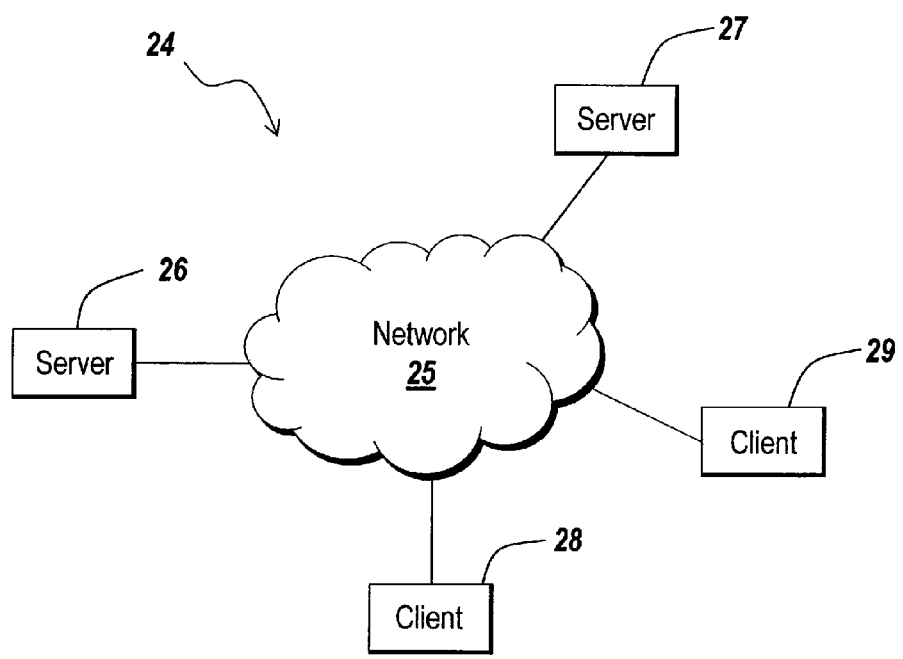
FIG. 2 shows an exemplary network environment suitable for practicing the illustrative embodiment of the present invention.

FIG. 2 is an exemplary network environment 24 suitable for the distributed implementation of the illustrative embodiment. The network environment 24 may include one or more servers 26 and 27 coupled to clients 28 and 29 via a communication network 25. The network interface 16 and the modem 15 of the computing device 10 enable the servers 26 and 27 to communicate with the clients 28 and 29 through the communication network 25. The communication network 25 may include Internet, intranet, LAN (Local Area Network), WAN (Wide Area Network), MAN (Metropolitan Area Network), etc. The communication facilities can support the distributed implementations of the present invention.

In the network environment 24, the servers 26 and 27 may provide the clients 28 and 29 with software components or products under a particular condition, such as a license agreement. The software components or products may include those for providing a block diagram environment and a block diagram created in the block diagram environment. The clients 28 and 29 may construct a block diagram using the software components and products provided by the servers 26 and 27, and submit the block diagram to the servers 26 and 27 for the execution of the block diagram. The servers 26 and 27 may execute the block diagram and return the execution results to the clients.

Figure 3:
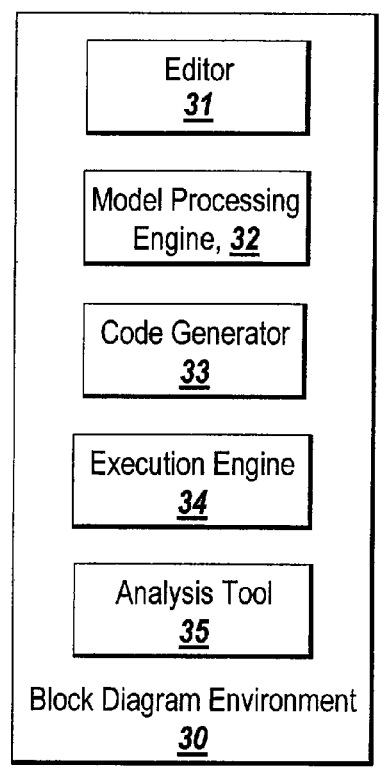
FIG. 3 depicts an exemplary block diagram environment provided in the illustrative embodiment of the present invention.

FIG. 3 depicts an exemplary block diagram environment 30 provided in the illustrative embodiment. The block diagram environment 30 may include an editor 31, a model processing engine 32, a code generator 33, a model execution engine 34 and an analysis tool 35. The block diagram environment 30 allows a user to perform various types of tasks including constructing system models through a user interface that allows drafting block diagram models, allowing augmentation of a pre-defined set of blocks with custom user-specified blocks, the use of the block diagram model to compute and trace the temporal evolution of the dynamic system's outputs ("executing" the block diagram), and automatically producing either deployable software systems or descriptions of hardware systems that mimic the behavior of either the entire model or portions of it (referred to herein as "code generation").

Figure 4:
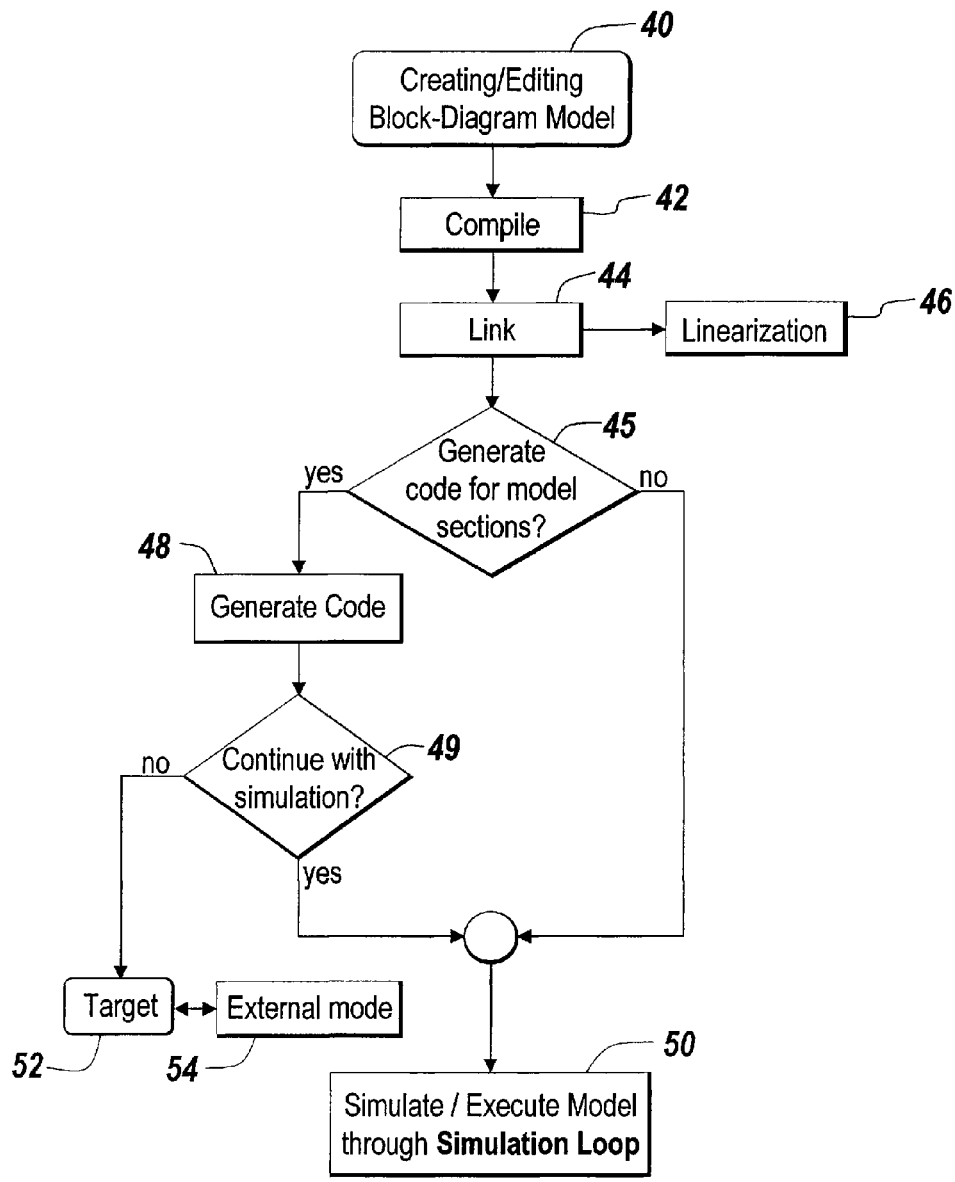
FIG. 4 is a flow chart of the sequence of steps used to perform simulation of a block diagram.

FIG. 4 is a flow chart showing an exemplary operation of the block diagram environment 30. A block diagram may be created/edited (step 40) using the block diagram editor 31 that allows a user to perform such actions as draw, edit, annotate, save, and print out block diagram representations of dynamic systems. Blocks are the fundamental mathematical elements of a classic block diagram model. The block diagram editor 31 is the graphical user interface (GUI) component that allows drafting of block diagram models by a user. In Simulink®, there is also a textual interface with a set of commands that allow interaction with the graphical editor 31. Using this textual interface, users may write special scripts that perform automatic editing operations on the block diagram. A user generally interacts with a set of windows that act as canvases for the model. There is generally more than one window for a model because models may be partitioned into multiple hierarchical levels through the use of subsystems.

Figure 5:
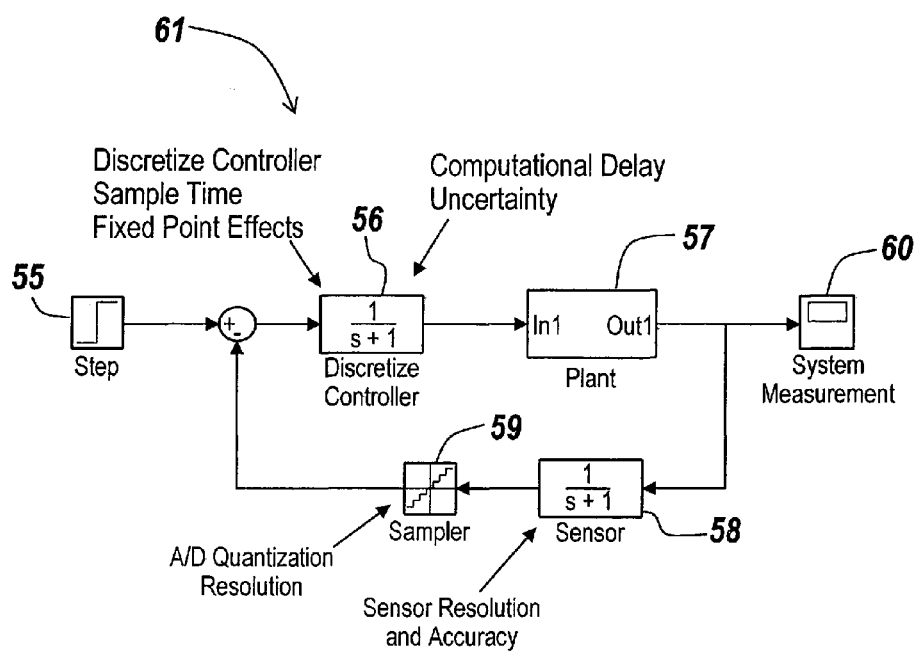
FIG. 5 depicts an exemplary block diagram model created in the illustrative embodiment.

FIG. 5 shows an exemplary block diagram model 61 of a control system constructed using the editor 31 in the illustrative embodiment. The block diagram model 61 includes Step block 55, Controller block 56, Plant block 57, Sensor block 58, Sampler block 59 and System Measurement block 60. The Plant block 57 may represent a physical system being controlled by a controller represented by the Controller block 56. For example, the physical system and controller can be a vehicle engine and engine controller, respectively. The Controller block 56 can be a subsystem block that refers to a separate model designed by a user. The Controller block 56 may present a digital system embedded in a mass production system and executing the software generated from the model 61 to control the physical system. The Sensor block 58 may represent a sensor that detects a signal from the physical system and feeds the detected signal to the controller. Before the detected signal is fed to the controller, the signal is converted to a digital signal by an analog to digital (A/D) converter represented by the Sampler block 59. The Step block 55 is a source block that applies a step input signal to the system. The System Measurement block 60 displays the output of the system. One of skill in the art will appreciate that the block diagram model 61 and its elements 55-60 are illustrative and not limiting the scope of the present invention.

Once a block diagram model has been constructed using the editor 31, the processing engine 32 carries out the task of compiling the block diagram to produce an "in-memory executable" version of the model that is used for generating code and/or simulating a block diagram model (step 42). The compile stage involves checking the integrity and validity of the block interconnections in the block diagram. Virtual blocks play no semantic role in the execution of a block diagram. In this step, the virtual blocks in the block diagram are optimized away (removed) and the remaining non-virtual blocks are reconnected to each other appropriately. This compiled version of the block diagram with actual block connections is used in the execution process.

The way in which blocks are interconnected in the block diagram does not necessarily define the order in which the equations (methods) corresponding to the individual blocks will be solved (executed). The actual order is partially determined during the sorting step in compilation. The step in sorting involves transforming the graphical block diagram into a compiled (in-memory) directed graph consisting of arcs and vertices. The graph is used to sort the blocks into a linear sorted list.

After compilation, the link stage commences (step 44). During this stage physical memory allocations are made in order to prepare for execution. Buffers are allocated for block input and output data buffers, states, and work areas. Additionally, block method execution lists that are derived from the sorted list allow for execution of the block diagram. Each block method execution list is a list of block methods that are to be executed in a sequence when each method within the list has a sample hit. There is generally a set of block method execution lists associated with each layer of the block diagram that corresponds to a non-virtual subsystem. Non-virtual subsystems are either defined by the user or automatically synthesized during compilation to either efficiently execute the model or simplify the implementation of the semantics defined by Simulink®. In multi-tasking mode, the lists within each layer may be further partitioned when block diagrams have blocks with different sample rates.

For linearization (step 46), Simulink® uses the block method execution lists in a prescribed fashion to produce a linear state space representation of the dynamic system described by the block diagram. The illustrative embodiment may use the output of the Link stage to compute linear models through a process generally referred to as model linearization. These linear models may be used in the SimLoop at various points in the execution of the overall model. The linearization process may involve the use of a Jacobian method defined on blocks and numerical Jacobian algorithm.

After linking has been performed, the code generator 33 may generate code (step 45). In this stage, the code generator 33 may choose to translate the block diagram model (or portions of it) into either software modules or hardware descriptions (broadly termed code). If code is generated (step 48), then the stages that follow use the generated code during the execution of the block diagram. A decision is made (step 49) whether to continue the simulation. If the decision is made to continue the simulation the model is simulated/executed through the Simulation Loop (step 50). If the simulation is not continued, the code may be delivered to a target (step 52) and executed in an external mode (step 54). In this case, the user can deploy the code outside the confines of the block diagram software. If code is not generated (step 45), then the execution engine 34 uses an interpretive mode of execution for the block diagram (step 50). Upon reaching the simulation stage, the execution engine 34 uses a simulation loop to execute block methods in a pre-defined ordering upon a sample hit to produce the system responses as they change with time.

The analysis tool 35 works with other elements of the block diagram environment 30 and provides various functions that enable a user to analyze a model to determine the digital effects of the model. The digital effects refer to the effects of the model when the software generated from the model is executed in a digital system. The digital effects may include the effect of the word size and/or execution speed of a microprocessor in the digital system. The digital effect may also include the effect of other digital components, such as an A/D converter or sampler, in the system. For example, the word length of the A/D converter or sampler may affect the performance of the digital system. The analysis tool 35 therefore enables the user to analyze the digital effects generated by the components of the digital system and to determine the minimum hardware requirements of the digital system that can execute the software generated from the model properly.

The illustrative embodiment of the present invention is independent of the operating scenarios of a control system. In the case of varying the sample rate of a controller, there may be a discrete number of available sample rates to simulate over to find an optimal rate of a controller. There may also be other variables that should be considered, such as operating conditions (e.g., ambient conditions in a car control) and operating scenarios (e.g., the trajectory of speed variations during the operation of a car). In reality there are a near infinite number of operating scenarios that can be simulated in order to study the trade-off between the sample rate and cost of a microprocessor.

The conventional brute force simulation or Monte Carlo simulation can be used for situations where there are limited factors to consider. In particular, the operating scenarios prove to be a particular difficulty for the brute force analysis. The analysis techniques of the present invention, however, allow for the dependence on the operating scenarios to be decoupled from the analysis. For example, stability margin, pole/zero, and frequency response theory of linear systems is independent of the operating scenarios.

The analysis techniques of the present invention can apply to a real, large and complex system while the conventional analysis methods are limited to specific problems solved by a researcher. For example, the study of the stability of a linear system subject to varying the sample rate of a controller typically requires that the system has a single sample rate and the system is linear in the conventional analysis methods. In real world control systems, however, these assumptions are usually not true.

Figure 6A:
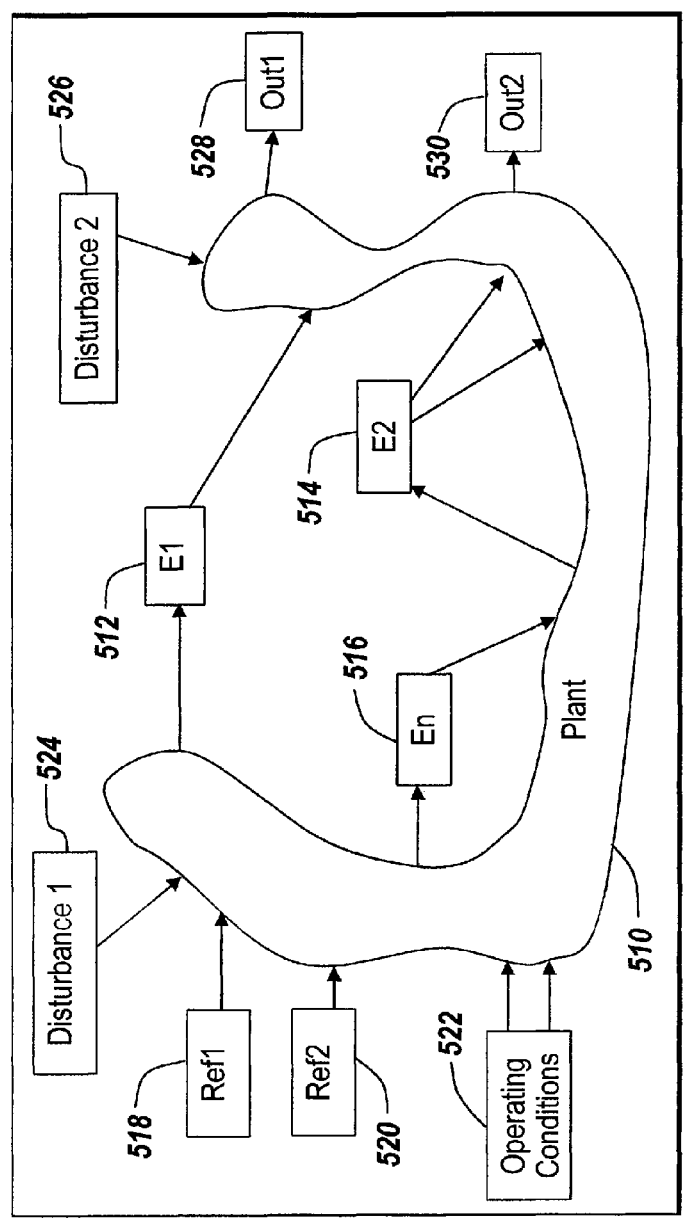
FIG. 6A is a diagrammatic illustration of an example complex control system.

FIG. 6A shows a general system that the analysis tool 35 can be applied to in the illustrative embodiment of the present invention. In real world applications, a model of a plant and corresponding controller(s) is complex. Most control systems are MIMO (multi-input multi-output) in nature. FIG. 6A illustrates a model of plant operations, and the various controllers and variables that may be encountered in a simulation. A nonlinear plant 510 has a first element 512, a second element 514, up to "n" elements 516. The digital elements 512, 514 and 516 are components that the user studies the digital effects.

There are multiple inputs to the first, second, and n elements 512, 514, and 516 in the form of a first reference 518, a second reference 520, operating conditions 522, a first disturbance 524, and a second disturbance 526. The references 518 and 520 are known input signals, such as step functions and sinusoidal signals. The operating conditions 522 are sets of values around which a dynamical system actively operates. The disturbances 524 and 526, often called exogenous disturbances, are events that interact with a dynamical system, but are not part of the plant or inputs to the system. Noise, such as a random Gaussian-distributed signal, is a common disturbance. Many disturbances are modeled as stochastic.

The elements 512, 514, and 516 control the plant 510 and produce a first output 528 and a second output 530. The outputs 528 and 530 are the output signals of the system. Control engineers use feedback of output signals. Feeding the outputs back in as inputs helps stabilize and control plants. Also, measurements of output signals help engineers determine if the design of the system meet specifications.

The behavior of the control system is dependent upon multiple inputs, complex operating conditions, multiple control elements, and multiple output signals. This desired behavior is expressed in many different ways by engineers as "performance constraints". These "performance constraints" are usually based on characteristics of the output and internal signals of the control system under normal operating conditions when the system is subject to changes in reference and disturbance signals. In addition there may be requirements or "design specifications" that the dynamics of the control system meet certain stability specifications such as gain and phase margins. The design specifications are defined to be based on some combination of the controllers and the plant of the control system. An example of this is well known that the stability margins of a control system can be based on the frequency response of an interconnection between controller and the plant. There are a plurality of controllers, feedback loops, or compensators, that must be designed and subsequently tuned in complex control systems. In such a situation, engineers typically design control systems and portions of control systems without taking into account dynamics that result from a change in inputs across the entire plant 510 or changes to other portions of the control system. The focus of a control system design is to transform the performance constraints and design specifications required of the feedback control system to the analysis used in control design.

In the illustrative embodiment, block diagram models, such as the model depicted in FIG. 5, can be built using linear and nonlinear components at different sample rates and the analysis techniques of the present invention can apply to those block diagram models. The user may specify the elements (E1, E2, . . . , En) inside the control system that have digital effects. The user interfaces depicted in FIGS. 13-17 may list the candidate blocks with digital effects. Discrete time elements, such as integrator blocks, transfer functions, and state space, may have a sample rate where a user typically may trade-off the costs of a faster microprocessor vs. the performance of the control system. Also the user may study the effects of best and worse case computational delays on a system. All blocks with fixed point parameterizations, such as gain blocks and discrete filter blocks, may allow for the fixed point parameterizations to be analyzed. The blocks with potential uncertainty can be used to model the uncertainty in the calibration of a sensor. The blocks with potential variability in quantization behavior may be the quantization block which models the effects of sampling a continuous signal in both time and in resolution.

The user then specifies what they are interested in studying. There may a number of factors that an engineer may be interested. These may include assessment of the closed loop stability of the system given the digital effects that the user has specified, computation of the overshoot, rise time, settle time of controlled signals given step inputs, assessment of the degradation of the closed loop bandwidth using frequency response plots.

The analysis tool 35 then may linearize the model and extract a linear fractional representation (LFT) which can be used for the analysis of the model. In the illustrative embodiment, the analysis techniques applied to block diagram models use linearization theory and linear fractional representation analysis to formulate the analysis. The linearization combined with the robustness/hybrid system analysis provides a more scalable analysis tool to be used on large and complicated problems.

Figure 6B:
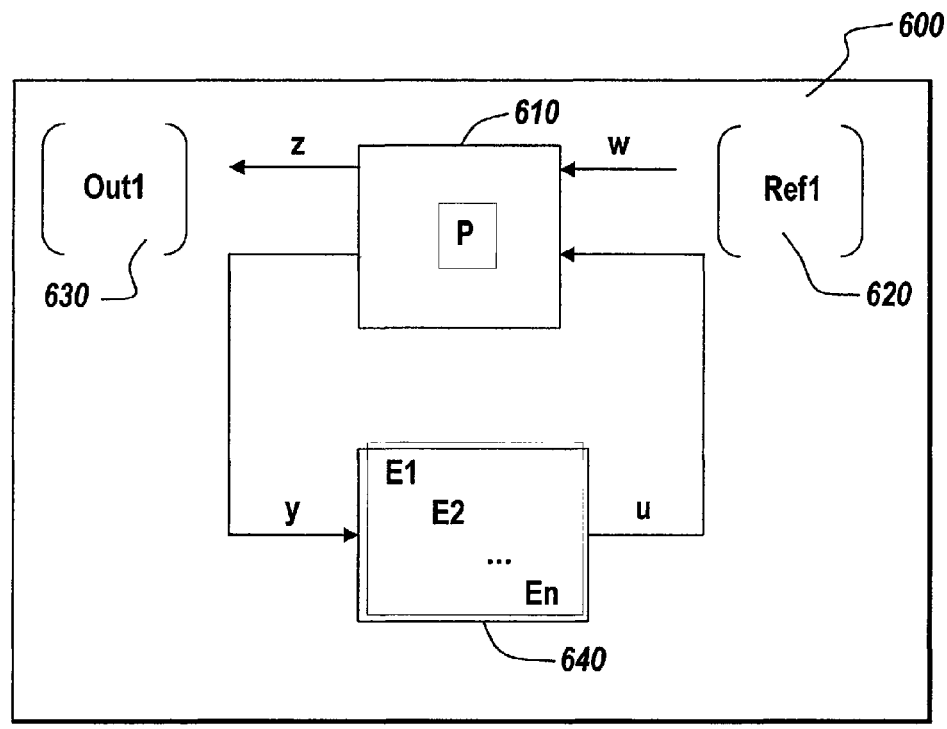
FIG. 6B is an exemplary linear fractional representation of linearized models utilized in the illustrative embodiment.

FIG. 6B depicts an exemplary linear fractional representation of the general control system depicted in FIG. 6A. The LFT representation 600 shows the elements (E1, E2, . . . , En) 640 relative to the plant 610. The reference input 620 and reference output 630 are also illustrated. In the LFT representation 600, the elements (E1, E2, . . . , En) 640 can be analyzed separately from the remainder of the model. The linear fractional representation of a model is described in more detail in co-pending application Ser. No. 10/991,899 ("METHOD FOR ANALYSIS OF CONTROL SYSTEMS" filed on Nov. 17, 2004, which is incorporated by reference. The LFT representation shown in FIG. 6B is applicable to most of the analysis methods that study these digital effects.

Figure 7:
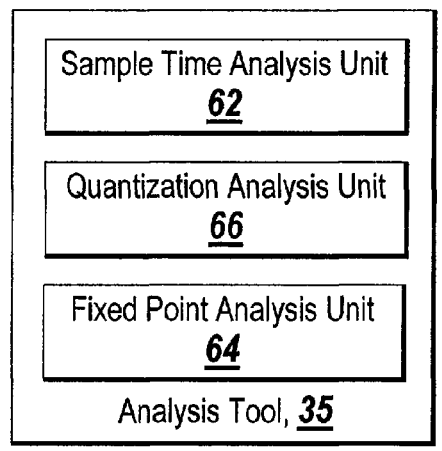
FIG. 7 shows an exemplary analysis tool provided in the illustrative embodiment of the present invention.

FIG. 7 is an exemplary analysis tool 35 provided in the illustrative embodiment. Those of ordinary skill in the art will appreciate that the analysis tool 35 can be provided as a separate application or as a part of existing applications including MATLAB®, Simulink® or their family of products, such as Simulink® Control Design, Fixed-point Toolbox, Simulink® Fixed-point, Real-Time Workshop, Real-Time Workshop Embedded Coder, Stateflow® Coder, Simulink® Verification and Validation, Control System Toolbox, Robust Control Toolbox, etc.

The analysis tool 35 may include, amongst other units, a sample time analysis unit 62, a fixed-point analysis unit 64 and a quantization analysis unit 66. The sample time analysis unit 62 may analyze a model to determine the effect of the sample time of the model on the performance of the model. The fixed-point analysis unit 64 may analyze a model to determine the effect of the fixed-point data type of the model on the performance of the model. The quantization analysis unit 66 may analyze a model to determine the effect of a sampler or A/D converter on the performance of the model. The performance of the model can be evaluated using classical control system analysis methodologies, such as the step response analysis, Bode diagram analysis, Nyquist plot analysis, Nichols plot analysis, etc. Those of ordinary skill in the art will appreciate that the units depicted in FIG. 7 are illustrative and not limiting of the scope of the present invention. These units will be described below in more detail with reference to FIGS. 8-12.

Figure 8:
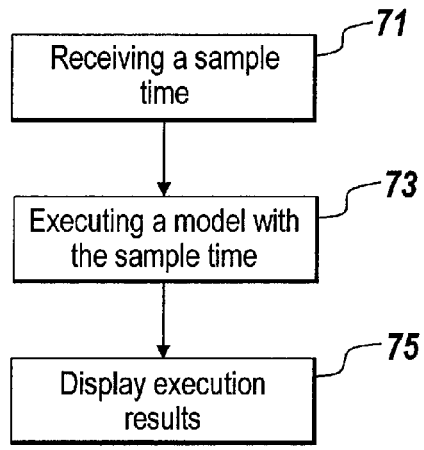
FIG. 8 is a flow chart showing an exemplary operation of the sample time analysis unit depicted in FIG. 7.

FIG. 8 is a flow chart showing an exemplary operation of the sample time analysis unit 62 in the illustrative embodiment. The sample time analysis unit 62 may provide user interfaces that enable a user to specify a sample time of a model, such as the block diagram model 61 depicted in FIG. 5 (step 71). The sample-time is the time interval at which the inputs, state, or outputs of the system are traced as time progresses. Based on sample times, a system can be described as a discrete-time system, continuous-time system and hybrid system. A discrete-time system is a system in which the evolution of the system results is tracked at finite intervals of time. In the limit as the interval approaches zero, the discrete-time system becomes a continuous-time system. The intervals of time may be periodic or non-periodic. If a system has only one sample time, it is said to be single-rate. If a system has multiple sample times, it is said to be multi-rate. Multi-rate systems can be evaluated (executed) using either a single-tasking form of execution or a multi-tasking form of execution. When multi-tasking execution is used, it conforms to rate monotonic scheduling principals.

The sample time analysis unit 62 may then work with the model processing engine 32 and the model execution engine 34 so that the model 61 can be executed with the user-defined sample time (step 73). After the model execution engine 34 executes the model, the sample time analysis unit 62 may receive the execution results from the model execution engine 34. The sample time analysis unit 62 may also analyze the execution results to provide information about the effect of the sample time on the performance of the model. The sample time analysis unit 62 may analyze the execution results using the classical control system analysis methodology, such as Step Response, Bode Diagram, Nyquist Plot and Nichols Plot. Those of skill in the art will appreciate that these analysis methodologies are illustrative and not limiting the scope of the present invention. Those of skill in the art will also appreciate that these analysis methodologies can be performed by a single step or batch analysis.

Figure 9:
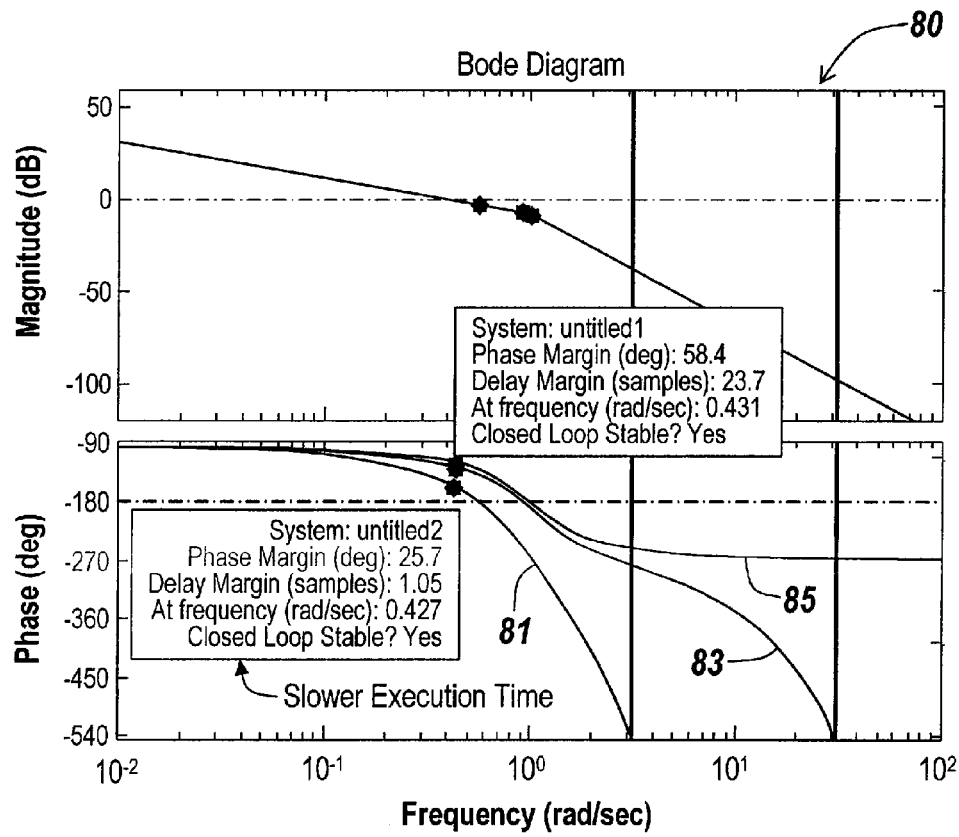
FIG. 9 shows an exemplary Bode diagram displayed by the sample time analysis unit.

The sample time analysis unit 62 may repeat the steps 71 and 73 with different sample times. The sample time analysis unit 62 may display the execution results information on the System Measurement block 60 depicted in FIG. 5 (step 75). FIG. 9 shows an exemplary Bode Diagram 80 displayed on the System Measurement block 60 when the user executes the block diagram model 61 with three different sample times. The Bode Diagram 80 shows that the phase response curves 81, 83 and 85 are shifting to the left as the sample time increases (indicated by an arrow), which means that the stability margin decreases as the execution speed is lower. From the information provided in the Bode Diagram 80, the sample time analysis unit 62 may analyze the execution results to determine the stability margin of the system by calculating the phase margin and the delay margin of the system, as shown in FIG. 9 (step 77). Based on the calculations, the sample time analysis unit 62 may determine whether the corresponding sample time can make the system stable. Given the sample time that can make the system stable, the sample time analysis unit 62 may also determine the execution speed of the digital system that can properly execute the software generated from the model 61.

Figure 10:
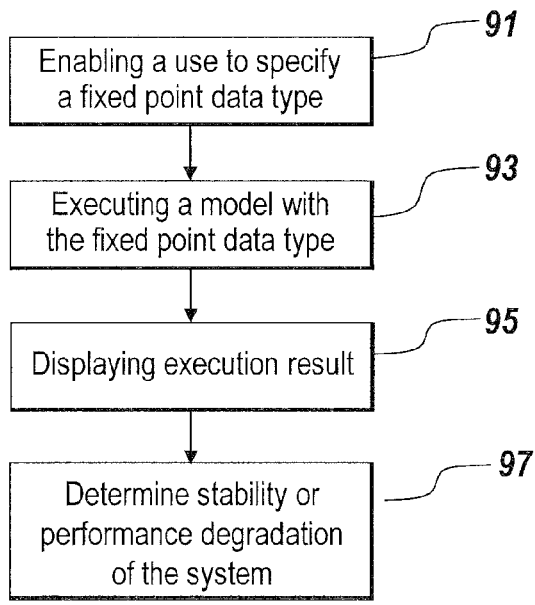
FIG. 10 is a flow chart showing an exemplary operation of the fixed-point analysis unit depicted in FIG. 7.

FIG. 10 is a flow chart showing an exemplary operation of the fixed-point analysis unit 64 in the illustrative embodiment. The input and output data used and generated in the block diagram model 61 can be defined as a fixed-point data type or a floating-point data type. The floating-point data type is characterized by a sign bit, a fraction (or mantissa) field, and an exponent field. The floating-point data can be represented in either double-precision or single-precision format. According to IEEE Standard 754 for double precision, any value stored as a double-precision data type requires 64 bits. According to IEEE Standard 754 for single precision, any value stored as a single-precision data type requires 32 bits.

The fixed-point data type is characterized by a word size expressed in bits, a binary point, and whether it is signed or unsigned. The binary point is the means by which fixed-point values are scaled. With Simulink® Fixed-point from The MathWorks, Inc., fixed-point data types can be integers, fractionals, or generalized fixed-point numbers. The main difference between these data types is their default binary point. Simulink® supports the fixed-point word sizes of up to 128 bits.

The fixed-point analysis unit 64 may provide user interfaces that enable a user to specify a fixed-point data type for the data used and generated in the block diagram model 61 (step 91). The user interfaces may also enable a user to specify the word size of the data in the block diagram model 61. The fixed-point analysis unit 64 may then work with the model processing engine 32 and the model execution engine 34 so that the model 61 can be executed with the user defined fixed-point data type and word size (step 93). After the model execution engine 34 executes the model, the fixed-point analysis unit 64 may receive the execution results from the model execution engine 34. The fixed-point analysis unit 64 may analyze the execution results to provide information on the effect of the user-defined word size of the data on the performance of the model 61. The fixed-point analysis unit 64 may analyze the execution results using the classical control system analysis methodology, such as Step Response, Bode Diagram, Nyquist Plot and Nichols Plot. Those of skill in the art will appreciate that these methodologies are illustrative and not limiting the scope of the present invention.

The fixed-point analysis unit 62 may repeat the steps 91 and 93 with different word sizes. The fixed-point analysis unit 62 may display the execution results information on the System Measurement block 60 depicted in FIG. 5 (step 95). The stability or performance of the system 61 may degrade as the resolution of the data is lower. The fixed-point analysis unit 64 may analyze the execution results to determine the stability or performance degradation of the system (step 97). Based on the calculations, the fixed-point analysis unit 64 may determine whether the word size of the data can make the system stable. Given the word size of the data that can make the system stable, the fixed-point analysis unit 64 may also determine the word size of the digital system that can execute the software generated from the model properly.

Figure 11:
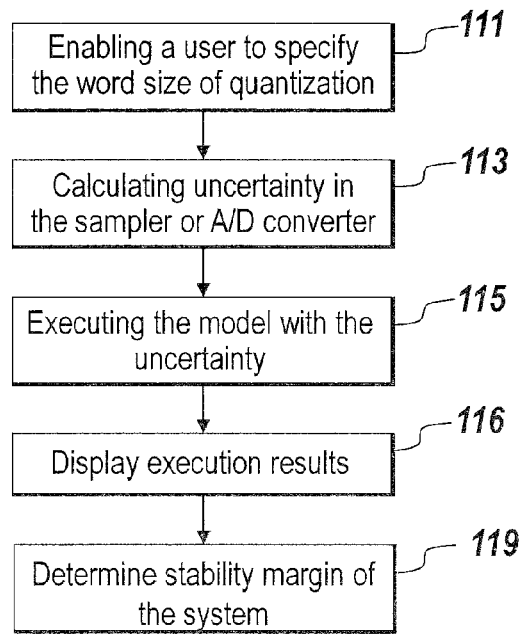
FIG. 11 is a flow chart showing an exemplary operation of the quantization analysis unit depicted in FIG. 7.

FIG. 11 is a flow chart showing an exemplary operation of the quantization analysis unit 66 in the illustrative embodiment. The quantization analysis unit 66 may provide user interfaces that enable a user to specify the word size of the sampler or A/D Converter block 59 in the model 61 (step 111). The A/D Converter block 59 configures a sampler or A/D converter to perform analog-to-digital conversion of the signals detected by the Sensor block 58. The A/D Converter block outputs digital values representing the analog input signal.

Figure 12:
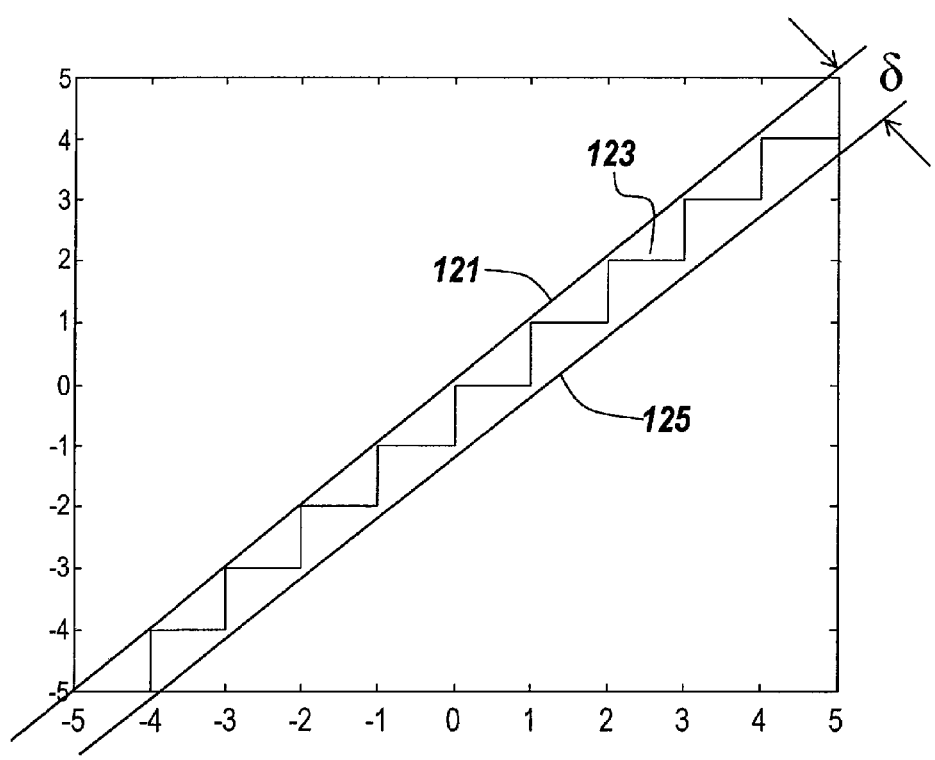
FIG. 12 shows exemplary input and output values of the sampler or A/D converter.

FIG. 12 shows an exemplary input and output of a sampler or A/D converter. The sampler or A/D converter produces nonlinear step values 123 in response to a linear input values 121. The size of the step depends upon the resolution or the word size of the sampler or A/D converter. In the output values of the sampler or A/D converter, there is uncertainty ($\delta$), which corresponds to the difference between the lines 121 and 125, depending upon the resolution or the word size of the sampler or A/D converter.

The quantization analysis unit 66 may calculate the uncertainty ($\delta$) of the output of the sampler or A/D converter based on the resolution or the word size of the sampler or A/D converter (step 113). The quantization analysis unit 66 may then work with the model processing engine 32 and the model execution engine 34 so that the model 61 can be executed with the uncertainty in the output of the sampler or A/D converter (step 115). The execution of a model with uncertainty can be performed using an application, for example, Robust Control Toolbox, from The MathWorks, Inc. After the model execution engine 34 executes the model, the quantization analysis unit 66 may receive the execution results from the model execution engine 34. The quantization analysis unit 66 may analyze the execution results to provide information on the effect of the uncertainty on the performance of the model. The quantization analysis unit 66 may analyze the execution results using the classical control system analysis methodology, such as Step Response, Bode Diagram, Nyquist Plot and Nichols Plot. Those of skill in the art will appreciate that these methodologies are illustrative and not limiting the scope of the present invention. The quantization analysis unit 62 may display the execution results information on the System Measurement block 60 depicted in FIG. 5 (step 116). From the information provided on the System Measurement block 60, the quantization analysis unit 66 may analyze the execution results to determine the stability margin of the system by calculating, for example, the phase margin and the delay margin of the system (step 119). Based on the calculations, the quantization analysis unit 66 may determine whether the word size of the sampler or A/D converter can make the system stable. The quantization analysis unit 66 may also determine whether the system achieves a required robustness to uncertainty of the system with the given word size of the sampler or A/D converter.

Figure 13:
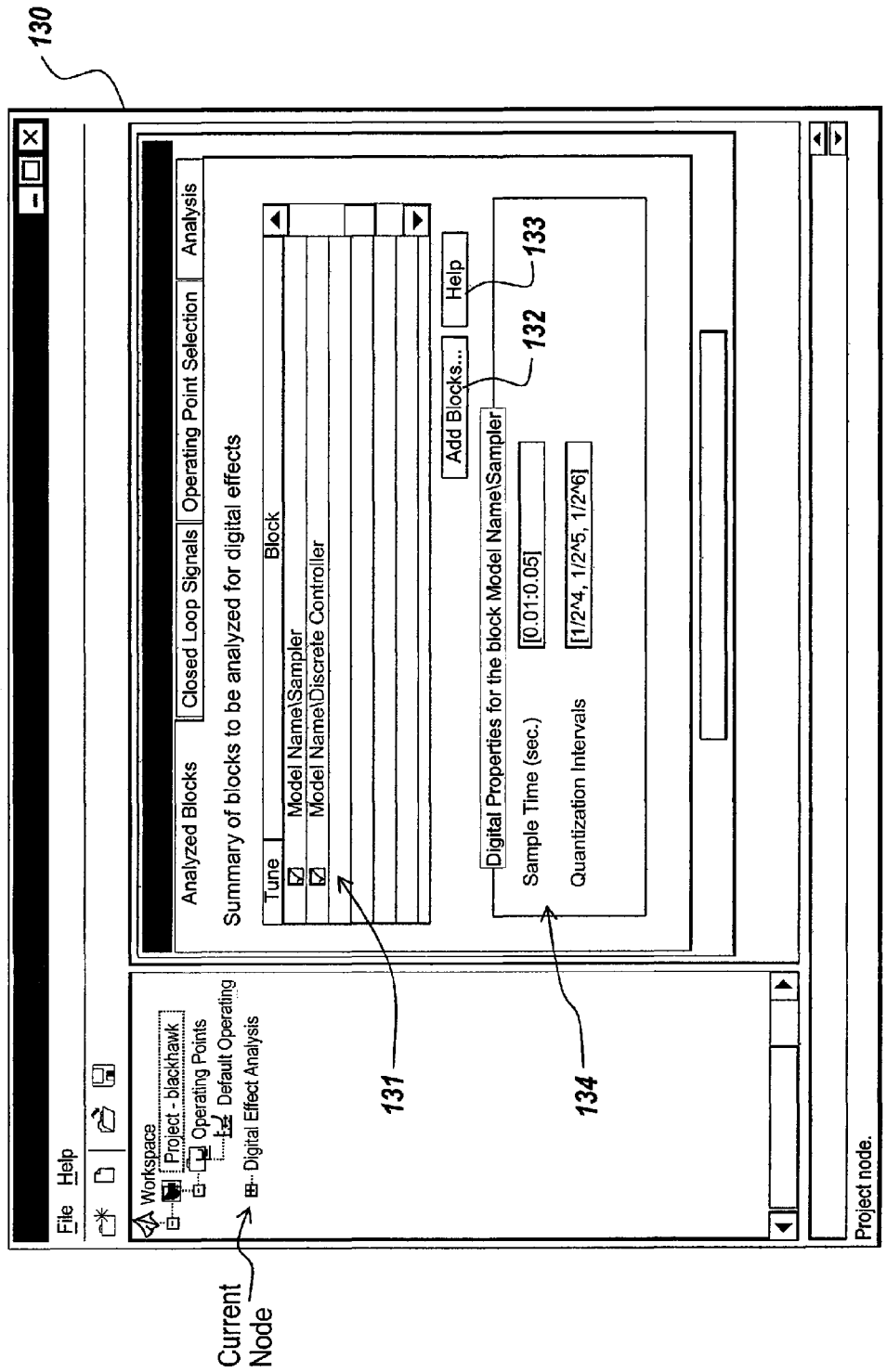
FIGS. 13-17 shows exemplary user interfaces provided in the tool of the illustrative embodiment.

The analysis tool 35 of the illustrative embodiment may provide user interfaces for enabling a user to input control data and for displaying analysis results to the user. FIGS. 13-17 shows exemplary user interfaces provided in the tool 35 of the illustrative embodiment. FIG. 13 shows a user interface 130 enabling a user to select blocks to be analyzed for digital effects. The user interface 130 may provide a list 131 of the blocks, such as the sampler block 59 and the discrete controller block 56 in the block diagram model 61, that the user currently sets for analysis. The button 132 may allow the user to select blocks to tune at a given subsystem level, which will be described below in more detail with reference to FIG. 14. The Help button 133 may launch a help window for providing help information on the tool 35. The user interface 130 may also include a pane 134 for enabling a user to specify the sampling time of the block diagram. The pane 134 may also enable the user to specify quantization intervals for the quantization (sampler) element.

Figure 14:
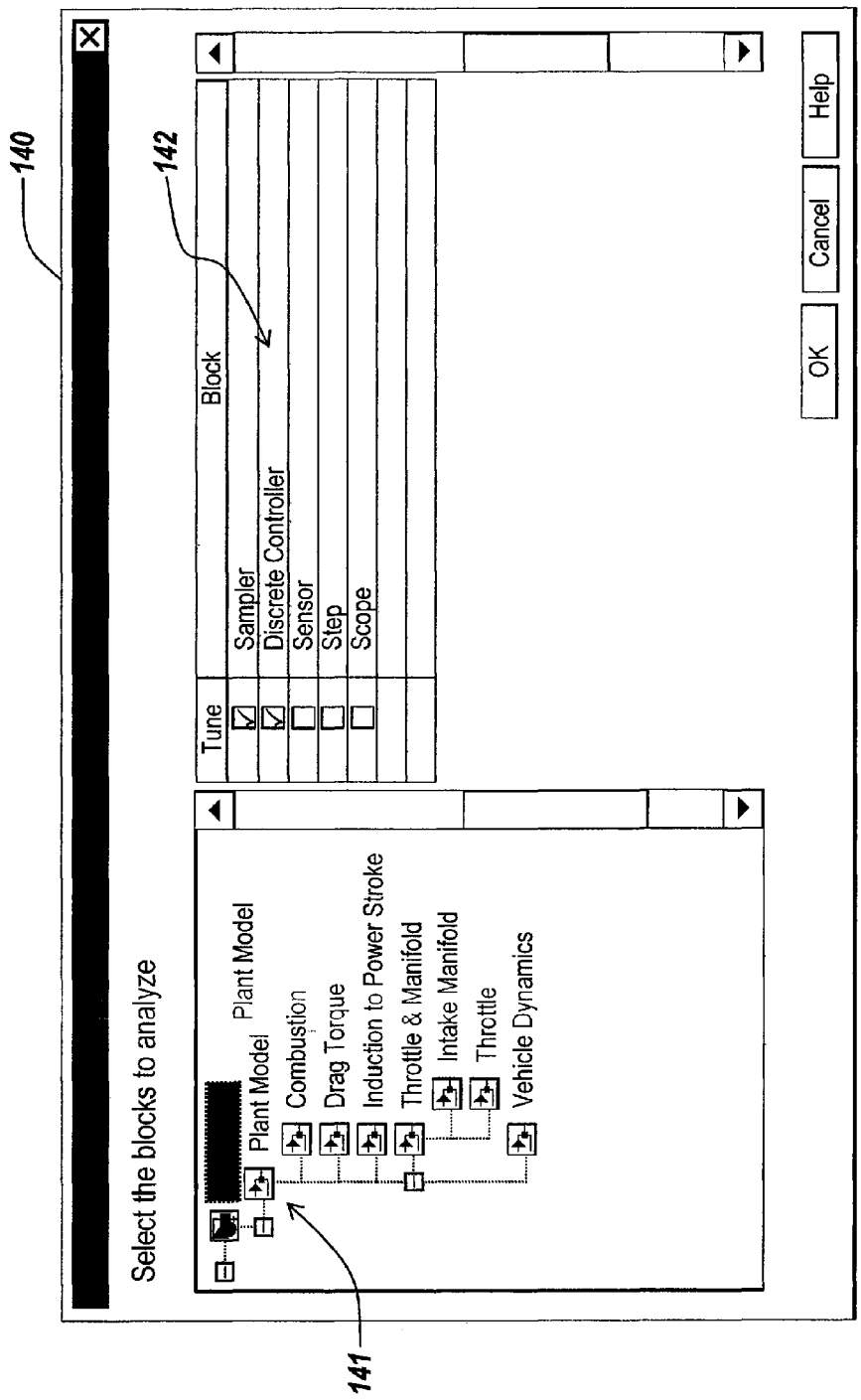

FIG. 14 shows an exemplary user interface 140 that allows the user to select blocks to tune at a given subsystem level. The user interface 140 may list the hierarchy 141 of a block diagram model including the subsystems of the model. In the hierarchy of the model, a subsystem may include one or more subsystems. If the user selects a subsystem in the hierarchy 141, the list 142 provides blocks in the subsystem and the user is allowed to select blocks to analyze at this level of the subsystem.

Figure 15:
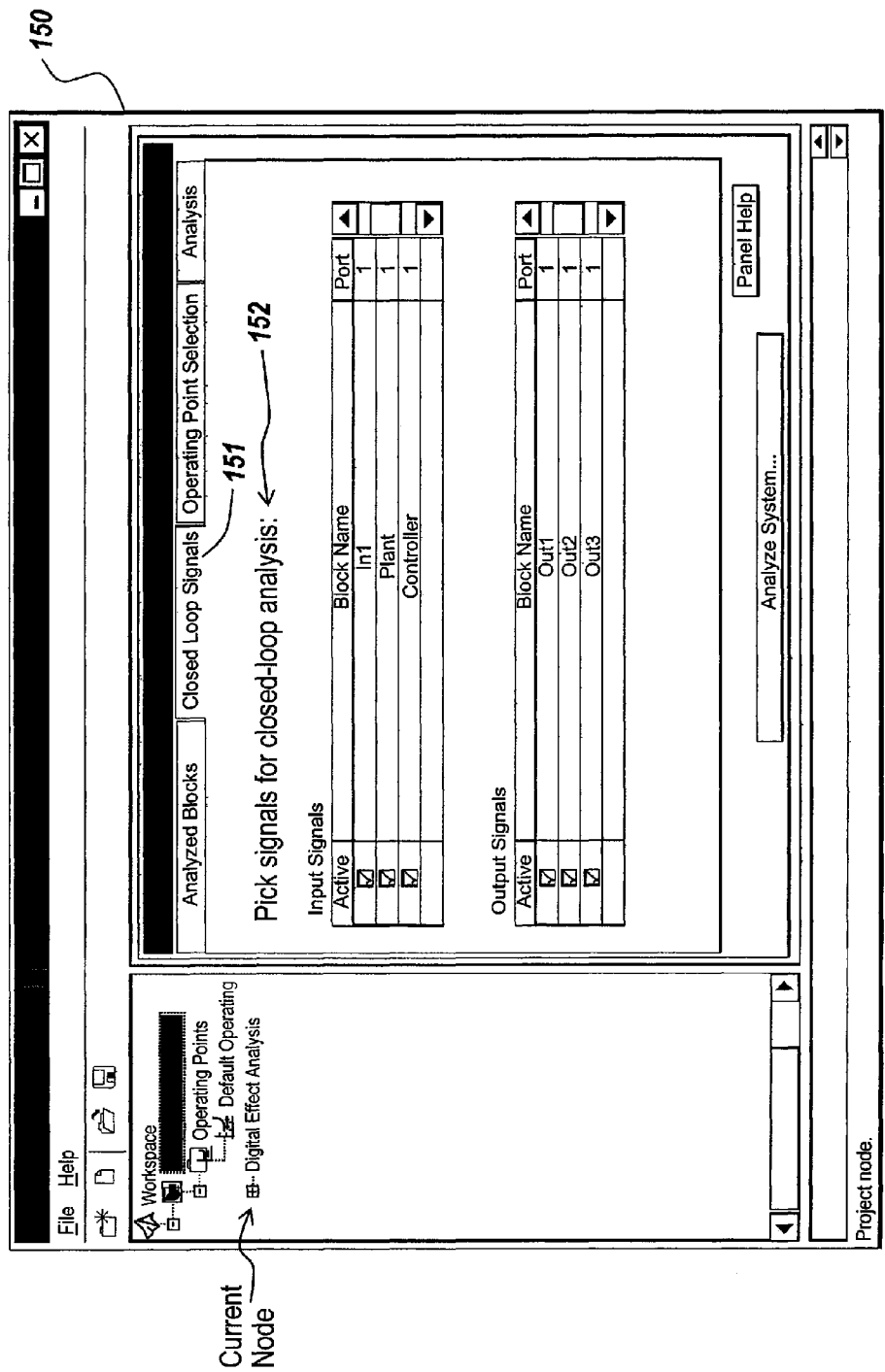

FIG. 15 shows an exemplary user interface 150 that allows a user to select input and output signals in a block diagram model for the closed-loop analysis of the model. The user interface 150 provides a tab 151 that enables the user to specify the closed loop input and output signals that are of interest to the user when analyzing the digital effects of the model. On clicking the tab 151, the user interface 150 may provide a pane 152 that enables the user to select blocks whose input and output signals are of interest to the user.

Figure 16:
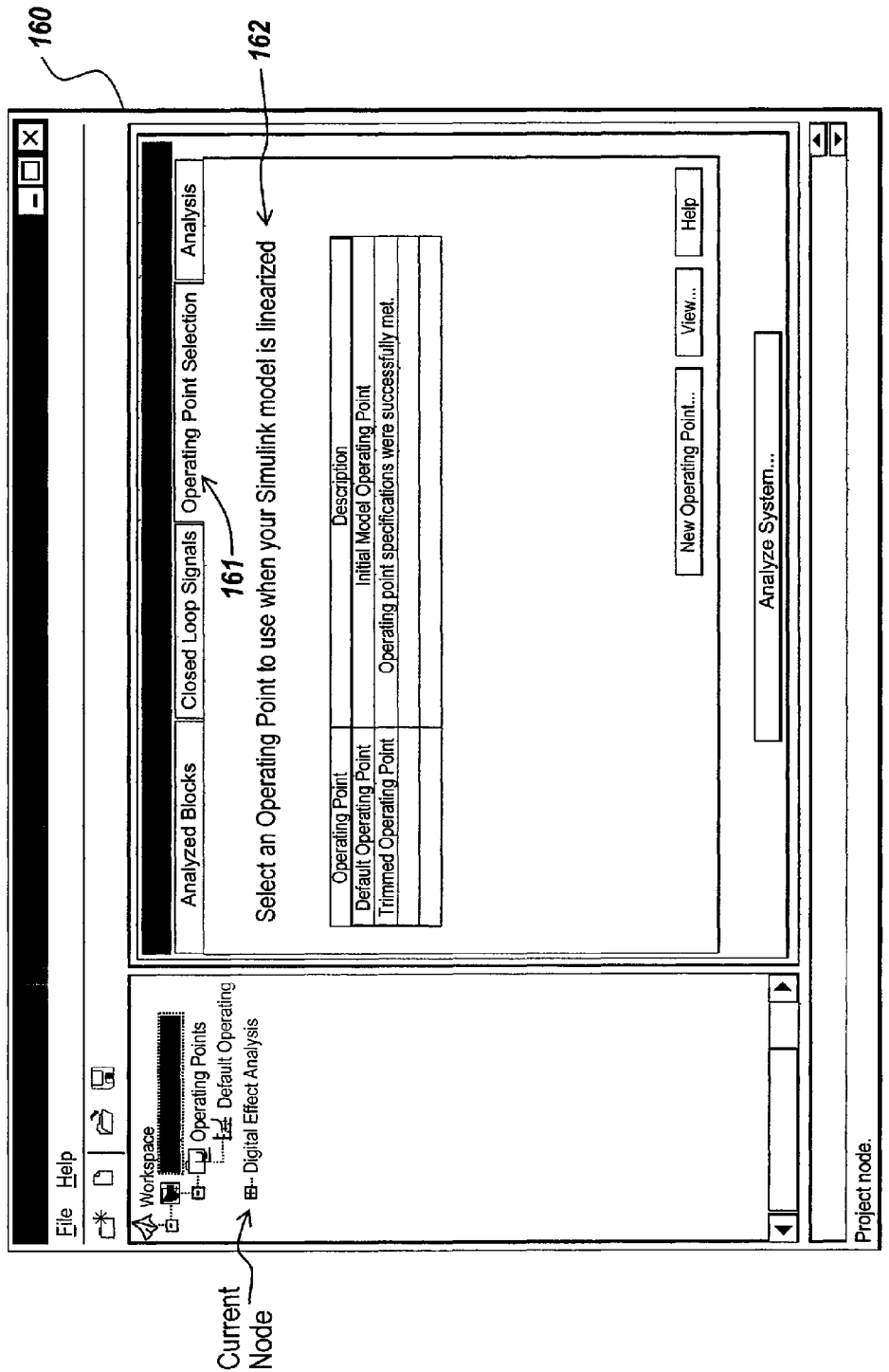

FIG. 16 shows an exemplary user interface 160 that allows a user to select an operating point of the block diagram model. The user interface 160 provides a tab 161 that enables the user to select an operating point at which the block diagram model is analyzed. On clicking the tab 161, the user interface 160 may provide a pane 162 for selecting an operating point to use when the model is linearized. In this example, the pane 162 provides a default operating point that is an initial model operating point and a trimmed operating point that meets operating point specifications. The user can select one of the operating point provided in the pane 162. Optionally, the user interface 160 may provide a button 163 for enabling the user to create a new operating point of the model. The linearization of a block diagram model is described in co-pending U.S. patent application Ser. No. 10/940,104 ("ANALYZING LINEARIZATION OF MODELS IN MODELING ENVIRONMENTS") filed on Sep. 13, 2004, which is incorporated by reference.

Figure 17:
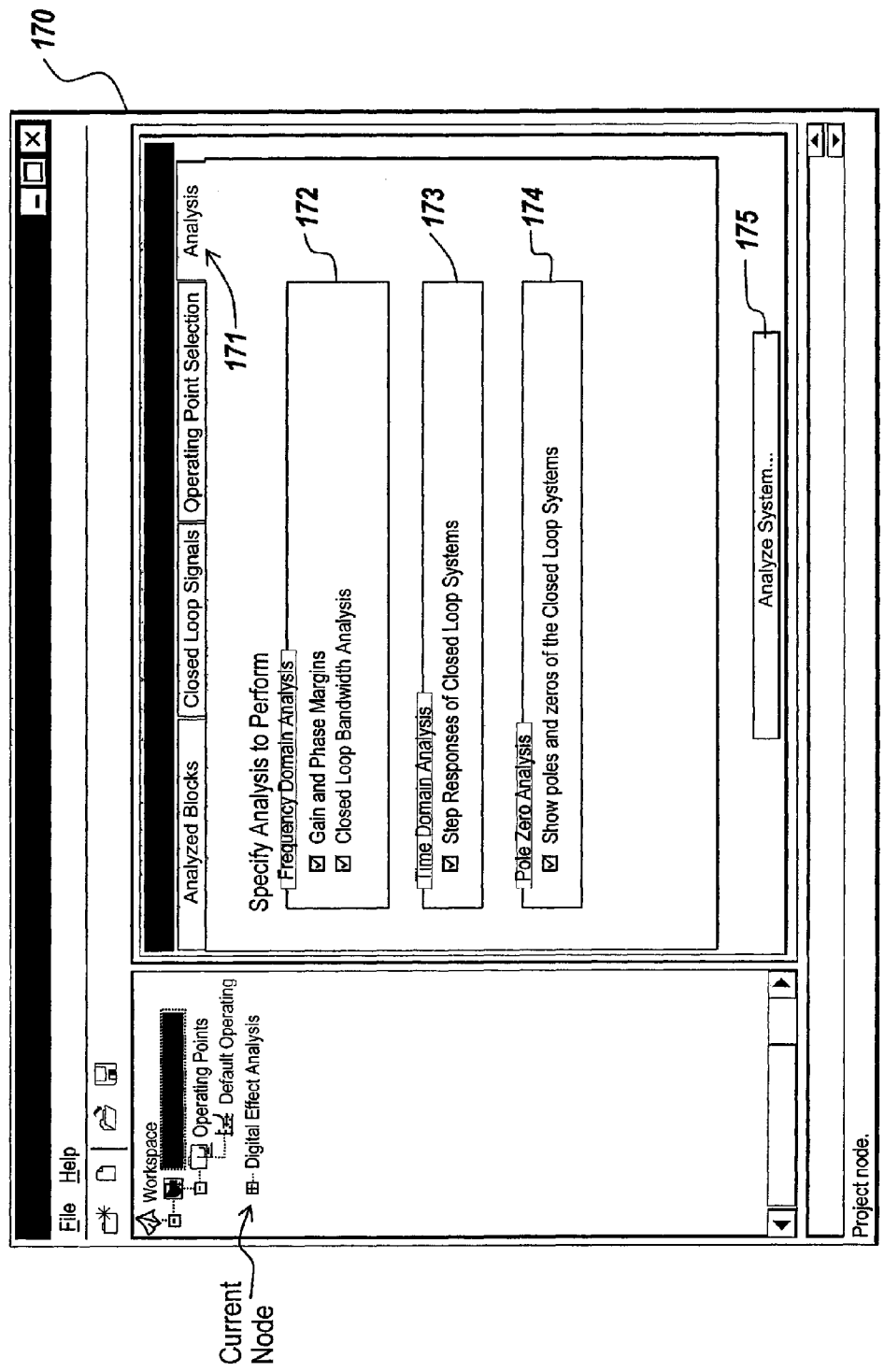

FIG. 17 shows an exemplary user interface 170 that allows a user to set up analysis methods for analyzing the block diagram model. When the user clicks the Analysis tab 171, panes 172, 173 and 174 are provided to enable the user to select analysis methods for analyzing the block diagram model. In the illustrative embodiment, the panes 172, 173 and 174 provide methods for frequency domain analysis, time domain analysis and pole zero analysis, respectively. One of ordinary skill in the art will appreciate that these analysis methods are illustrative and other analysis method can be provided in the user interface 170. The user can select one or more analysis methods provided in the user interface 170. If the user clicks the button 175 in the interfaces 130, 150, 160 and 170, the tool 35 linearizes and analyzes the block diagram model based on the user defined settings including the block selection and configuration, closed loop input and output signals, and the operating point. The analysis tool 35 then provides analysis plots, as depicted in FIG. 9.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

What is claimed is:

1. In a computing device, a method of analyzing a model of a physical dynamic system in a modeling environment, the method comprising:
   providing a model of a dynamic system, where the modeled system includes a plurality of elements;
   receiving via an interface a selection, the selection including a selected element, where:
      the selected element is included in a display of model elements,
      the selected element includes a parameter having a digital effect, and
      the digital effect affects:
         a stability of the modeled system when code for the modeled system is executed, or
         a required performance of the modeled system when code for the modeled system is executed;
   receiving a specification of stability or performance criteria for the model;
   programmatically extracting a linear fractional representation from the model based on the selection of the selected element;
   simulating the model and the linear fractional representation, the simulating producing a result;
   analyzing programmatically the linear fractional representation based on the result of the simulation, the analyzing identifying a value for the parameter of the selected element that causes the executed model to satisfy the stability or performance criteria; and
   programmatically determining, based on the analyzing, a hardware requirement required for a digital system to execute code representing the model.

2. The method of claim 1 wherein the parameter of the selected element relates to a discretization of the modeled system.

3. The method of claim 1 wherein the modeled system includes a microprocessor and the parameter of the selected element affects emulations or simulations of the modeled system using the microprocessor.

4. The method of claim 1 wherein the modeled system includes an A/D converter and the parameter of the selected element affects emulations or simulations of the A/D converter.

5. The method of claim 1 wherein the parameter of the selected element is one of a sample time of the model or a data type used in the model.

6. The method of claim 1 wherein the stability or performance criteria is one of a stability margin requirement of the modeled system, a rise time in a step response of the modeled system, a numerical accuracy needed in the model or a robustness to uncertainty of the modeled system.

7. The method of claim 1 wherein the model is used to generate code following the determining of the hardware requirement.

8. The method of claim 1 wherein the hardware requirement is for a minimum hardware requirement required for a digital system to execute code representing the model.

9. A non-transitory computer-readable medium holding computer-executable instructions that when executed cause a computing device to:
   provide a model of a dynamic system, where the modeled system includes a plurality of elements;
   receive via an interface a selection, the selection including a selected element, where:
      the selected element is included in a display of model elements,
      the selected element includes a parameter having a digital effect, and
      the digital effect affects:
         a stability of the modeled system when code for the modeled system is executed, or
         a required performance of the modeled system when code for the modeled system is executed;
   receive a specification of stability or performance criteria for the model;
   programmatically extract a linear fractional representation from the model based on the selection of the selected element;
   simulate the model and the linear fractional representation, the simulating producing a result;
   analyze programmatically the linear fractional representation based on the result of the simulation, the analyzing identifying a value for the parameter of the selected element that causes the executed model to satisfy the stability or performance criteria; and
   programmatically determine, based on the analyzing, a hardware requirement required for a digital system to execute code representing the model.

10. The non-transitory computer-readable medium of claim 9 wherein the parameter of the selected element relates to a discretization of the modeled system.

11. The non-transitory computer-readable medium of claim 9 wherein the modeled system includes a microprocessor and the parameter of the selected element affects emulations or simulations of the modeled system using the microprocessor.

12. The non-transitory computer-readable medium of claim 9 wherein the modeled system includes an A/D converter and the parameter of the selected element affects emulations or simulations of the A/D converter.

13. The non-transitory computer-readable medium of claim 9 wherein the parameter of the selected element is one of a sample time of the model or a data type used in the model.

14. The non-transitory computer-readable medium of claim 9 wherein the stability or performance criteria is one of a stability margin requirement of the modeled system, a rise time in a step response of the modeled system, a numerical accuracy needed in the model or a robustness to uncertainty of the modeled system.

15. The non-transitory computer-readable medium of claim 9 wherein the model is used to generate code following the determining of the hardware requirement.

16. The non-transitory computer-readable medium of claim 9 wherein the hardware requirement is for a minimum hardware requirement required for a digital system to execute code representing the model.

17. A system of analyzing a model of a dynamic system, comprising:
a central processing unit configured to execute instructions for:
implementing a modeling environment for providing the model of the dynamic system, the modeled system including a plurality of elements, the plurality of elements including an element with a parameter having a digital effect, the digital effect affecting:
a stability of the modeled system when code for the modeled system is executed, or
a required performance of the modeled system when code for the modeled system is executed;
receiving via an interface a selection, the selection including a selected element, where:
the selected element is included in a display of model elements,
the selected element includes a parameter having a digital effect, and
the digital effect affects:
a stability of the modeled system when code for the modeled system is executed, or
a required performance of the modeled system when code for the modeled system is executed;
receiving a specification of stability or performance criteria for the model;
programmatically extracting a linear fractional representation from the model based on the selected element;
simulating the modeled system and the linear fractional representation, the simulating producing a result;
programmatically analyzing the linear fractional representation based on the result of the simulation, the analyzing identifying a value for the parameter of the selected element that causes the executed model to satisfy the stability or performance criteria, and
programmatically determining, based on the analyzing, a hardware requirement required for a digital system to execute code representing the model.

18. The system of claim 17 wherein the parameter of the selected element relates to a discretization of the modeled system.

19. The system of claim 17 wherein the modeled system includes a microprocessor and the parameter of the selected element affects emulations or simulations of the modeled system using the microprocessor.

20. The system of claim 17 wherein the modeled system includes an A/D converter and the parameter of the selected element affects emulations or simulations of the A/D converter.

21. The system of claim 17 wherein the model is used to generate code following the determining of the hardware requirement.

22. The system of claim 17 wherein the hardware requirement is for a minimum hardware requirement required for a digital system to execute code representing the model.

* * * * *